(12) United States Patent
Woehler

(10) Patent No.: US 8,024,219 B2
(45) Date of Patent: Sep. 20, 2011

(54) SYSTEMS AND METHODS FOR PLANNING DEMAND FOR A CONFIGURABLE PRODUCT IN A MANAGED SUPPLY CHAIN

(75) Inventor: Christian Woehler, Heidelberg (DE)

(73) Assignee: SAP AG, Walldorf (DE)

( * ) Notice: Subject to any disclaimer, the term of this patent is extended or adjusted under 35 U.S.C. 154(b) by 1151 days.

(21) Appl. No.: 10/582,331

(22) PCT Filed: Dec. 9, 2003

(86) PCT No.: PCT/EP03/14520
§ 371 (c)(1),
(2), (4) Date: Apr. 26, 2007

(87) PCT Pub. No.: WO2005/059783
PCT Pub. Date: Jun. 30, 2005

(65) Prior Publication Data
US 2007/0282662 A1    Dec. 6, 2007

(51) Int. Cl.
*G06F 7/22* (2006.01)
(52) U.S. Cl. .......................................................... 705/10
(58) Field of Classification Search .................. 705/7
See application file for complete search history.

(56) References Cited

U.S. PATENT DOCUMENTS

| | | | |
|---|---|---|---|
| 6,947,951 B1 * | 9/2005 | Gill | 1/1 |
| 7,672,862 B1 * | 3/2010 | Venkatasubramanyan et al. | 705/7.22 |
| 2001/0020230 A1 * | 9/2001 | Kaneko et al. | 705/8 |
| 2002/0099579 A1 * | 7/2002 | Stowell et al. | 705/7 |
| 2003/0050845 A1 * | 3/2003 | Hoffman et al. | 705/26 |

OTHER PUBLICATIONS

Tsai et al (Distributed iterative aggregation algorithms for box-constrained minimization problems and optimal routing in data networks), Jan. 1989, IEEE Transaction on automatic control, vol. 14. pp. 1-13.*

* cited by examiner

*Primary Examiner* — Romain Jeanty
(74) *Attorney, Agent, or Firm* — Finnegan, Henderson, Farabow, Garrett & Dunner, LLP

(57) ABSTRACT

Methods and systems are provided for planning demand for a configurable product in a managed supply chain. In one implement, a method is provided in which the configurable product has a product dependent characteristic and a product independent characteristic. A data storage system may store data with respect to a plurality of product independent characteristics and product dependent characteristics. A selection of a product to be represented and a particular characteristic to be represented are received. A planning parameter is also selected. Data is loaded from the data storage system into a buffer. A calculation is performed on the data with respect to the product dependent characteristics and the product independent characteristics. A hierarchy of the represented data is modeled in accordance with the planning parameter and used to administer the buffered data.

11 Claims, 5 Drawing Sheets

SYSTEMS AND METHODS FOR PLANNING DEMAND FOR A CONFIGURABLE PRODUCT IN A MANAGED SUPPLY CHAIN

This application is a national stage filing under 35 U.S.C. §371 of International Application No. PCT/EP2003/014520, filed Dec. 9, 2003, which published in the English language.

TECHNICAL FIELD

The invention relates to a method of planning demand for a configurable product having at least one product dependent characteristic and one product independent characteristic in a managed supply chain and a demand planner apparatus for a configurable product in a managed supply chain.

BACKGROUND TO THE INVENTION AND PRIOR ART

Demand planning is used to forecast the demand for products. Characteristic Based Forecasting (CBF) is a technique used in particular in demand planning. In CBF a set of characteristics is defined in order to forecast components of assembled products. The set of characteristics is called the CBF characteristics, and may also be referred to as the product dependent characteristics. For example, if the product is a car, the product dependent characteristics of the car may include colour and engine size. Products having product dependent characteristics are referred to as configurable products. In demand planning however, other product characteristics are also typically taken into account, such as sales region and customer channels. Such other product characteristics are referred to as product independent characteristics. In CBF it is known to perform a drill down with respect to a certain product. A drill down is a technique carried out, for example, for a particular product for assessing the incidence of a certain product with respect to a certain product characteristic. For example, a drill down may be carried out to assess how many red cars are sold. The drill down is a useful tool in demand planning because a drill down on a characteristic enables the user to display and maintain the forecast data for all the values of this characteristic at the same time. Further a drill down permits a percentage representation of the data to be accessed.

It has been found that conventional demand planning incorporating characteristics based forecasting suffer drawbacks. One problem is that drill down on a characteristic is challenging because conventionally it is performed when a large amount of data are displayed and maintained and because in the case of the CBF, the required calculations for the different levels of data are complicated due to the CBF specific logic. In particular, it has been found that these problems with conventional demand planning incorporating characteristics based forecasting render it impossible to perform a drill down in demand planning on product independent characteristics. This is limiting in terms of the information the user can readily access from the system.

It is an object of the present invention to address those problems encountered in conventional demand planning incorporating characteristics based forecasting.

SUMMARY

According to a first aspect of the invention, there is provided a method of planning demand for a configurable product having at least one product dependent characteristic and one product independent characteristic in a managed supply chain, comprising the steps of:

providing a data storage system to store data with respect to a plurality of product independent characteristics and product dependent characteristics, inputting the selection of at least one product to be represented, inputting the selection of a particular characteristic to be represented, inputting a planning parameter with respect to the selection of a particular characteristic or product, loading data to be represented from the data storage system into a buffer, performing a calculation on the represented data with respect to the product dependent characteristics and the product independent characteristics, modelling a hierarchy of the represented data, wherein the hierarchy is defined in accordance with the planning parameter, using the hierarchy for the administration of the buffered data.

By modelling a hierarchy an enhanced representation of data is achieved which is both flexible and calculations, such as drill down calculations to be carried out with respect to both product dependent and product independent characteristics.

According to a second aspect of the present invention, there is provided a demand planner apparatus for planning demand for a configurable product in a managed supply chain, wherein said demand planner is operatively associated with a data storage system to store data with respect to a plurality of product independent characteristics and product dependent characteristics, and wherein said demand planner is operatively associated with a user interface for receiving input of the selection of at least one product to be represented, input of the selection of a particular characteristic to be represented, and input of a planning parameter with respect to the selection of a particular characteristic or product, said demand planner apparatus comprising:

a storage medium having recorded therein processor readable code processable to plan demand for a configurable product in a managed supply chain, said code comprising data loading code processable load data to be represented from the data storage system into a buffer, calculation performing code processable to perform a calculation on the represented data with respect to the product dependent characteristics and the product independent characteristics, hierarchy modelling code processable to model a hierarchy of the represented data, wherein the hierarchy is defined in accordance with the planning parameter, using code processable to use the hierarchy for the administration of the buffered data.

According to a third aspect of the present invention, there is provided a user terminal comprising means operable to perform any of the methods of the first aspect of the present invention.

According to a fourth aspect of the present invention, there is provided a program storage device readable by a processing apparatus, said device embodying a program of instructions executable by the processor to perform the steps of the methods of the first aspect of the present invention.

BRIEF DESCRIPTION OF THE DRAWINGS

In order that the invention may be more fully understood embodiments thereof will now be described by way of example only, with reference to the figures in which.

DESCRIPTION OF THE PREFERRED EMBODIMENTS

Figure 1A:
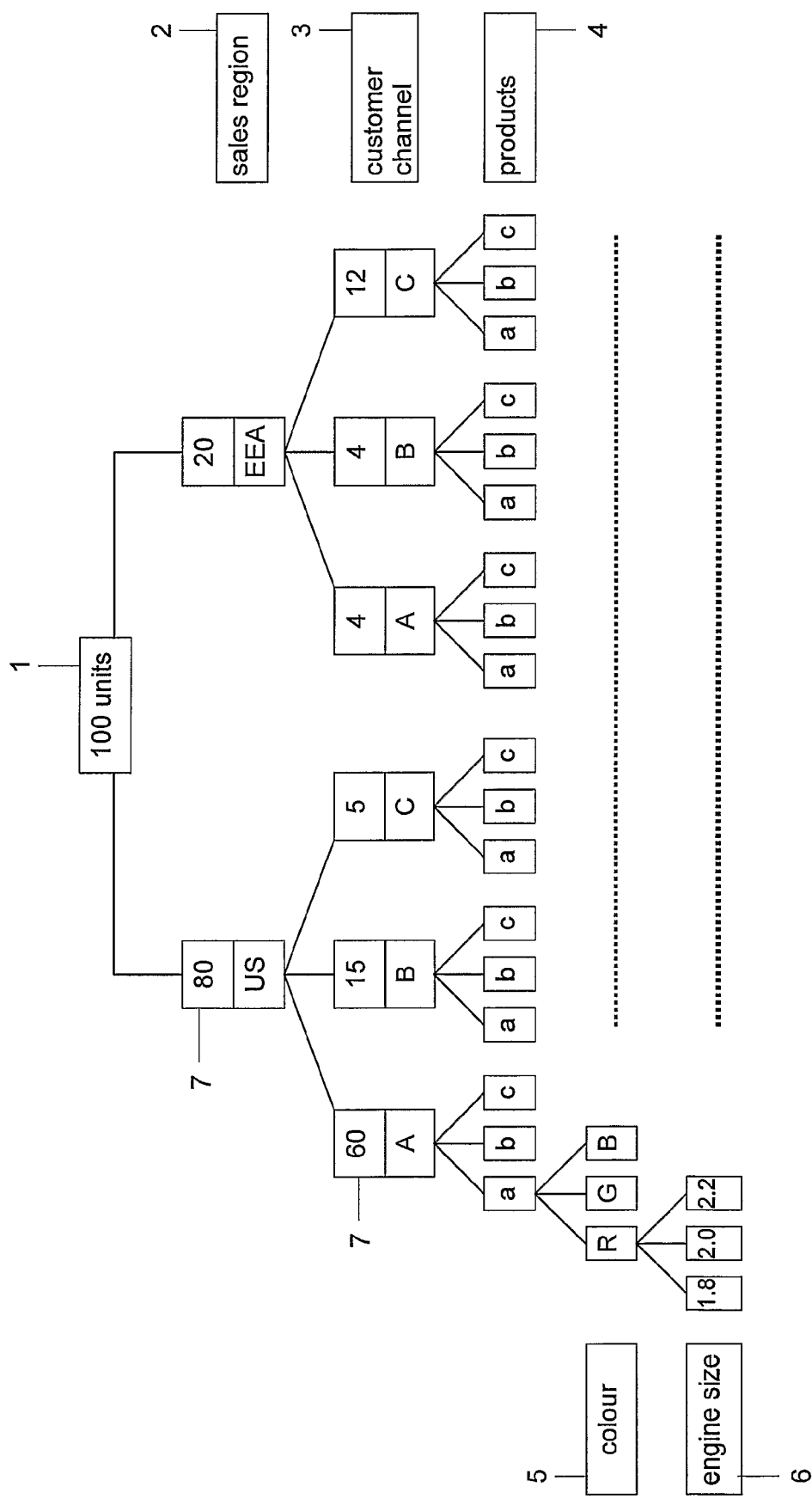
FIG. 1*a* shows an example of a modelled hierarchy according to an embodiment of the present invention.

FIG. 1*a* shows an example of a modelled hierarchy according to an embodiment of the present invention. In FIG. 1A, a modelled hierarchy is shown for example products. The products shown are cars. In the demand planning scenario shown, it is desired to plan demand according to a planning parameter 1 which includes the desire to plan for 100 units. The configurable products to be planned for include product independent characteristics 2, 3, 4, such as sales region 2, customer channel 3 and products 4, and product dependent characteristics 5, 6 such as colour 5, which include red R, green G and blue B and engine size 6, which include 1.8. 2.0 and 2.2 liters. As mentioned, a technique known as characteristics based forecasting (CBF) is a conventional technique for demand planning according to product dependent characteristics. For this reason, product dependent characteristics may also be referred to in the art, as CBF characteristics. The hierarchy shown in FIG. 1 includes a further planning parameter 7 that 80 units are to be planned for sale in the United States of America (US) and 20 units are to be planned for sale in the European Economic Area (EEA). The hierarchy includes a further planning parameter 8 that in the US in customer channel 3A, B and C, a demand of 60, 15 and 5, respectively, units are planned and that in the EEA in customer channel 3A, B and C, a demand of 4, 4 and 12, respectively, units are planned.

It is seen that the planning parameters 1, 7, 8 may defined in terms of product independent characteristics. However, it will be understood that a planning parameter may also be defined in terms of a product dependent characteristic. In FIG. 1 it is seen for example, that in the US, customer channel A demand is planned for three products a, b, c. Of these three products, product a may have the following product dependent characteristics: colour and engine size. As shown product a may be red, green or blue, and the engine size for the red products are 1.8, 2.0 and 2.2 liters.

It will be understood that the hierarchy shown in FIG. 1 is not complete for the sake of simplicity, whereas the hierarchy modelled according to the present invention may be modelled in part or in its entirety according to all the product independent and product dependent characteristics defined for the products to be represented.

Figure 1B:
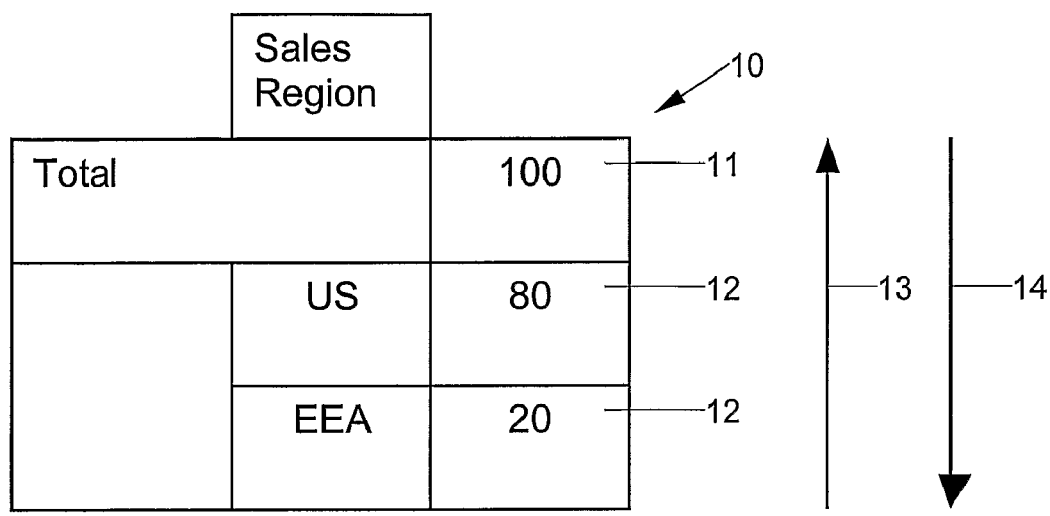
FIG. 1*b* shows an example of a drill down calculation according to an embodiment of the present invention.

FIG. 1*b* shows an example of a drill down calculation according to an embodiment of the present invention. In the example shown a first drill down calculation 10 is performed with respect to the product independent characteristic "sales region". The calculations yielded are shown in the table. The owner 11 is defined as being the total for the product independent characteristic. The members 12 are defined as being the values for each sales region which make up the total. If the calculation is carried out downwards through the hierarchy in the direction shown by arrow 14, it is defined as being a disaggregation, because from the total the value of each member is obtained. If, on the other hand, the calculation is carried out upwards through the hierarchy in the direction shown by arrow 13, it is defined as being an aggregation, because from the sum of each member the value of the owner is obtained. It will be understood that whether an aggregation or a disaggregation calculation is carried out will depend on the particular planning parameter or parameters.

Figure 1C:
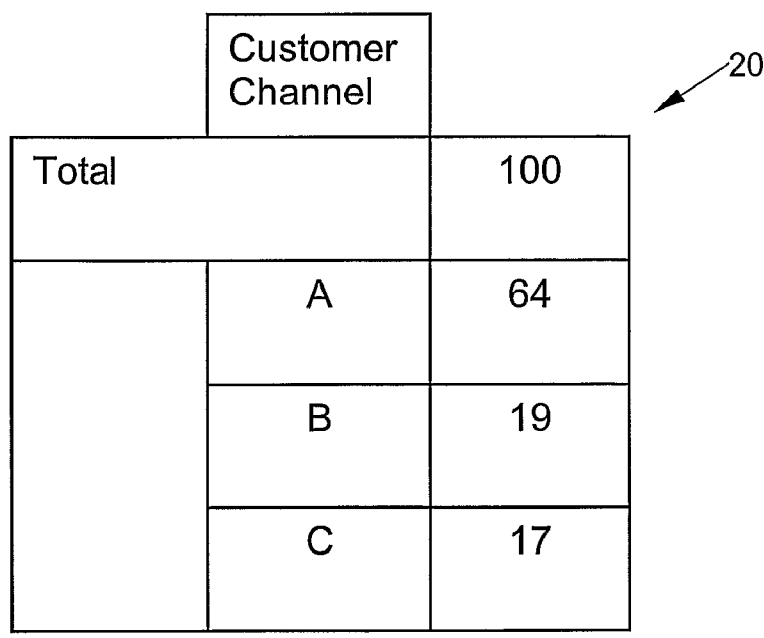
FIG. 1*c* shows a further example of a drill down calculation according to a further embodiment of the present invention.

FIG. 1*c* shows a further example of a drill down calculation according to a further embodiment of the present invention. In the example shown a second drill down calculation 20 is performed with respect to the product independent characteristic "customer channel". The calculations yielded are shown in the table. It will be seen that the drill down performs the calculation of summing the values for each customer channel across the sales regions in which each customer channel is to be found. Thus, again the calculation performed is dependent on the planning parameter selected.

Figure 1D:
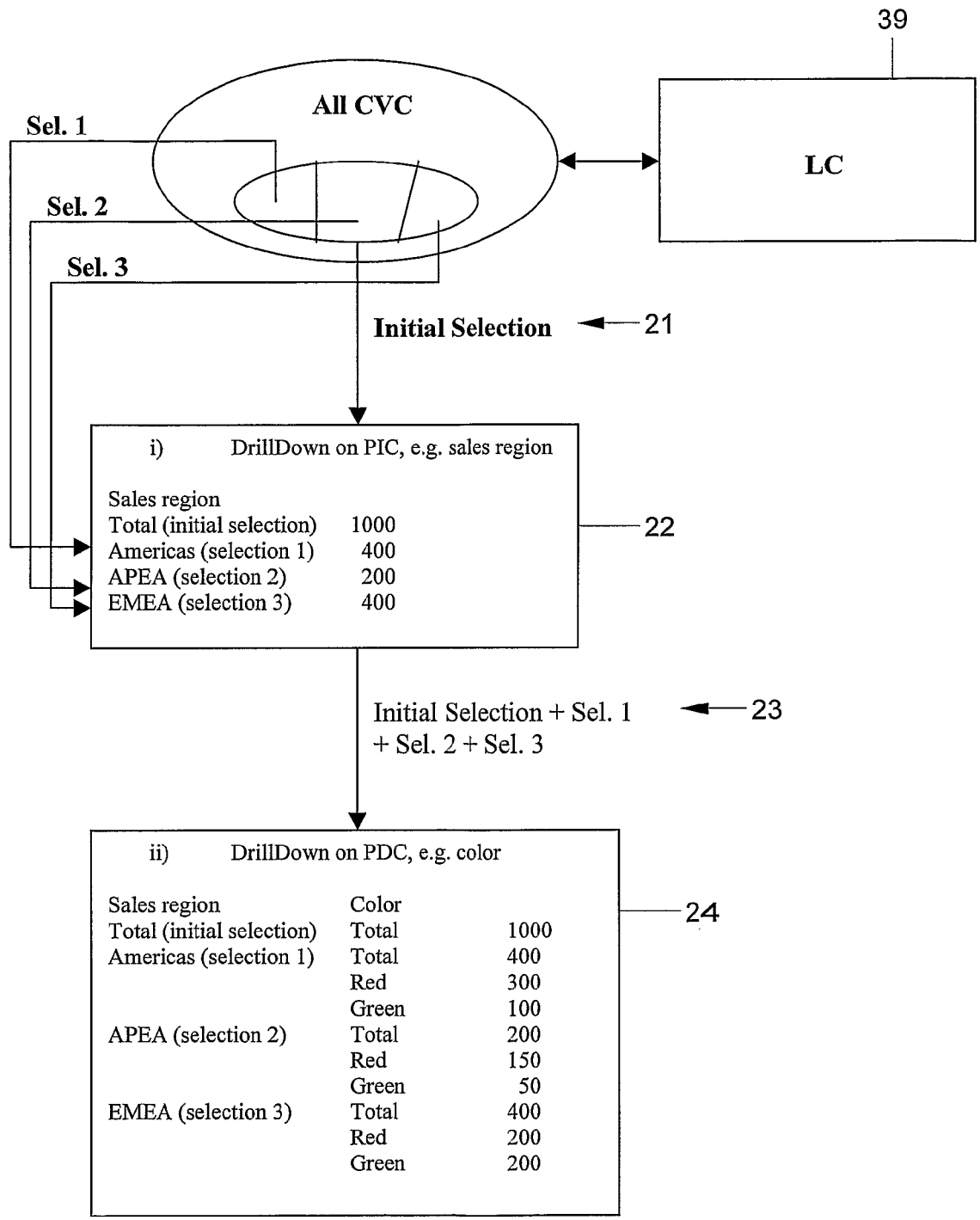
FIG. 1*d* shows a further example of a drill down according to a further embodiment of the present invention.

FIG. 1*d* shows a further example of a drill down according to a further embodiment of the present invention. According to an embodiment of the invention a selection is made. A selection specifies some characteristic values or not. In the case where no characteristic values are specified, all the data are aggregated. The selection, thereby defines a set of characteristic value combinations (CVC). The display then simply show a number for each time period over which the demand is planned.

Drill downs represent a more detailed view of the data of the selection with respect to one or more characteristic, that is the data are grouped by the characteristic values.

CVC are regarded as master data and the planning values stored in a data storage system, for example LiveCache, are transaction data. In CBF loading selections and saving them is typically the only interaction with the LiveCache. This is in contrast to conventional demand planning. Loading selections and saving them together with performing drill down affects the buffer hierarchy (the buffer hierarchy being defined in more detail below). However changing the transaction data changes only the contents of the buffer, but not its modelling, i.e. not the modelled hierarchy.

In particular, FIG. 1*d* shows how drill down on a product independent is handled in CBF according to an embodiment of the present invention. In the drill down the data is obtained from the data storage system 39, LiveCache by treating the details of the data as individual selections and performing the aggregation and disaggregation calculations in routines developed to provide this functionality. The routines may be written in ABAP. By doing so and in this way, the usual CBF logic can be applied in the drill down. For example, in FIG. 1*d* within the group of all characteristic value combinations (CV) which is represented by data which has been obtained from the data storage system 39, an initial selection 21 represented by ellipse is made. The initial selection 21 represents a product independent characteristic, for example, sales region. In order to carry out a drill down 22 on the product independent characteristic "sales region", the initial selection data is provided together with the selections representing the members of the product independent characteristic selected in the initial selection. In the example given, three subsequent selections are also made which correspond to the members of the product independent characteristic, "sales region" being the owner. Selection 1 representing the sales region "Americas", selection 2 representing "Asia" (APEA) and section 3 representing "Europe, Middle East and Africa" (EMEA). Consistent calculations are performed on the drill down data provided by the selections, so that the drill down data are read as individual selections, whereas the generalised data is used as the model for the buffer.

In order to carry out a product dependent characteristic drill down 24, the initial selection together with the individual selections are provided. So, for example, to carry out a drill down 24 with respect to the product dependent characteristic "colour", consistent calculations are performed wherein those calculations performed include CBF routines as well as those according to aspects of the present invention. All required data having been read with the selections and buffered in the generalised buffer.

It will be understood that within the characteristics based forecasting planning scenario different product independent characteristics can be used. In addition to those examples given with reference to FIG. 1 above a further common example is "location". As mentioned above, the characteristic "product", which is customary in characteristics based forecasting is generally also defined as a product independent characteristic.

In a further embodiment, the demand and production of a computer products is planned. The products to be assembled contain amongst others: a hard disc and a central processing unit (CPU). Two products are to be planned to include these components, a "standard computer" product and a "high end computer" product. Three hard discs are planned for inclusion in both the products, a "10 GB" hard disc, a "40 GB" hard disc and a "80 GB" hard disc.

For the next month, the user would like to maintain inclusion of 1000 10 GB hard discs in the products so that 90 percent are used in the standard computer an only 10 percent are used in the high end computer without changing the total number of 10 GB hard discs. According to this particular embodiment, the interactive demand planning of the present invention the following steps are carried out:
- define the selection with the characteristic hard disc for the value 10 GB,
- load the data for the selection, showing that 1000 10 GB hard discs are planned in the next month,
- perform a new drill down on product, giving for example the disaggregated display 1000→(500, 500) for the standard computer and high end computer, respectively,
- change the percentage representation, giving the disaggregation 100%→(50%, 50%),
- change the numbers to 100%→(90%, 10%),
- save the change.

By way of comparison with conventional demand planning using CBF, without the present invention, the user would have to load the data for the selection specifying the characteristic hard disc with the value 10 GB, write down the number for the next month, calculate 90% of it, then load the data for the selection specifying the standard computer and the hard disc with the value 10 GB and then enter the manually calculated value for the next month. The same procedure would be necessary for the high end computer. It will thus be understood that working with product dependent characteristics, the drill down on product independent characteristics represents an additional important and central functionality.

It will be understood that the present invention may create and maintain an internal hierarchy describing the new aggregation values, i.e., the new owner-member relationships, this hierarchy being used for the administration of the additionally buffered data. Further, existing CBF routines are enhanced so that they work consistently with the different new aggregation levels of the data. Moreover, the development and implementation of new routines for performing the aggregation and disaggregaton calculation between the different new aggregation levels of the data are provided.

Figure 2:
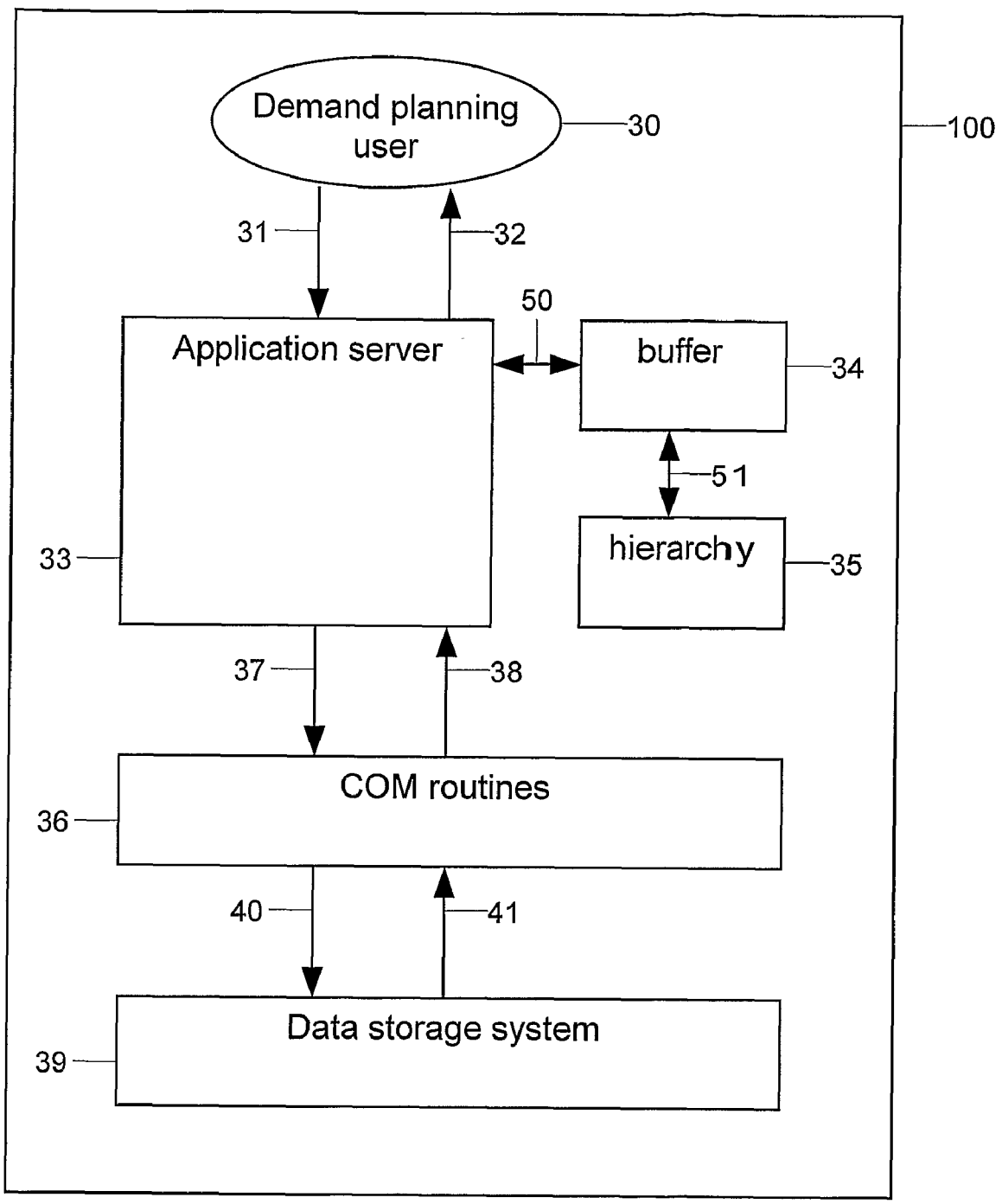
FIG. 2 shows an architecture incorporating an embodiment of the present invention.

FIG. 2 shows an architecture incorporating an embodiment of the present invention. A system 100 is shown on which the process described may be implemented, in particular the data flow and data processing steps initiated by the demand planning apparatus and method of an embodiment of the present invention are shown with respect to characteristics based forecasting. The system 100 includes a demand planning user 30 which is a graphic user interface (GUI), with which a user interacts. Typically, the user makes a request or inputs data 31 to an application server 33. In particular, the user inputs the selection of at least one product to be represented, the selection of a particular characteristic to be represented and a planning parameter or a plurality of planning parameters with respect to the selection of a particular characteristic or product. Having provided data and/a request, the user receives an output in the form of a delivery of data 32 from the application server 33. The application server 33 runs the application logic which carries out the demand planning. The system 100 further typically includes a programming system 36 for running Common Object Model (COM) routines 36 which define a network programming system. The COM routines receive a request or an input of data 37 from the application server. Furthermore, the COM routines deliver data 38 to the application server 33. The function of the COM routines is to carry out data transformation and data calculation. The COM routines are further in association with a data storage system 39, such as an object oriented database, for example, LiveCache. The COM routines send a request or an input of data 40 to the data storage system. The data storage system 39 delivers data 41 to the COM routines.

Returning to the application server 33, in one embodiment of the present invention, a demand planner apparatus is provided for planning demand for a configurable product in a managed supply chain, wherein the demand planner is operatively associated with a data storage system 39 to store data with respect to a plurality of product independent characteristics and product dependent characteristics, and wherein the demand planner is operatively associated with a user interface 30 for receiving input 31 of the selection of at least one product to be represented, input 31 of the selection of a particular characteristic to be represented, and input 31 of a planning parameter with respect to the selection of a particular characteristic or product, the demand planner apparatus comprising:

a storage medium 33 having recorded therein processor readable code processable to plan demand for a configurable product in a managed supply chain, the code comprising data loading code processable load data to be represented from the data storage system 39 into a buffer 34, calculation performing code processable to perform a calculation on the represented data with respect to the product dependent characteristics and the product independent characteristics, hierarchy modelling code 35 processable to model a hierarchy of the represented data, wherein the hierarchy is defined in accordance with the planning parameter, using code processable to use the hierarchy for the administration of the buffered data.

In particular, typically the application logic is written in Advanced Business Application Programming (ABAP), a computer language suitable for programming SAP applications. However, the invention is not limited in this respect and other programming languages are also suitable depending on the particular application the present invention is incorporated into. For situations where CBF is not to be carried out, the application logic carries out a data transformation function. On the other hand, for situation wherein CBF is to be carried out the application logic carries out the functions of performing a CBF data transformation, a CBF data calculation on a higher level and a CBF data calculation at a lower level. In order to carry out the data calculations an hierarchy modeller 35 and a buffer 34 are provided wherein the hierarchy obtained by the hierarchy modeller 35 is used to structure a table within the buffer 34. The hierarchy obtained is internal to the data to be represented, as is the table. In particular, at the higher level the following calculations are executed: a buffer 34 is created, data fills the buffer 34 from the data storage system 39. a calculation of the represented data is carried out, the hierarchy modeller 35 models a hierarchy of the represented data. On the basis of the hierarchy, which is communicated 51 to the buffer 34, the propagation calculation of changed data within the hierarchy, that is the aggregation and disaggregation calculation is carried out: the calculation being carried out by the data storage system 39. Subsequently, the data is prepared for saving in the data storage system 39.

Data is modelled using internal tables in the buffer. Several entries and more fields are used which model the relationship between owner and members. In particulars, with respect to a particular drill down, the buffer table structure allows owners and members to be identified, so that the desired data is extracted.

It will be understood that depending on the other applications comprised in the system 100, the system will include a plurality of GUIs and applications. Although, only one GUI and application are shown in FIG. 2 other GUIs and applications may also be comprised in the system.

In the demand planning application, the internal logic for dealing with characteristic based forecasting data incorporates the following: the data are stored in a data storage system 39, for example an object oriented data storage system, such as LiveCache. The data are typically represented with three technical characteristics for profile, table, and row. The presentation of the data for the application uses the CBF characteristics which describe the features of specific products. The calculation required between the internal representation of the CBF data and the application representation of the data are done a characteristic calculation function group 40 on the application server 33. The CBF calculations in this function group are based on the data of the global internal table. The data read from the data storage system, for example, LiveCache, are stored there together with all the results stored in the buffer 34 together with all the results calculated in order to provide data 50 to the application server 33.

Until now, the table comprised in the buffer 34 contains only one entry representing the CBF data of a specified selection of product independent characteristic, also referred to as free characteristic, combinations. The additional CBF data are stored in an internal table (not shown) for this selection.

According to embodiments of the present invention, performing the calculation on the represented data with respect to the product dependent characteristics and the product independent characteristics, can be handled by splitting up all the objects displayed into selections and storing them in different entries in the table in the buffer 34. This table may also be referred to as a global internal table or a buffer table. The CBF calculation logic used so far for one selection can then be applied to all the other entries in the table. The use of selections is preferred because CBF characteristics, by virtue of the definition, that is product dependent characteristics, depend on a specific products, that is they are generally defined with respect to specific products only, and therefore the additional CBF data have to be assigned to specified products. In summary, the global internal table comprises different entries which are not independent. The calculations required between them are done by the data storage system 39, for example, the LiveCache but the results and their dependencies are stored in the global internal table which is formed in the buffer 34. After this the CBF specific calculations can be executed for each entry according to data of the respective entry.

The table located in the buffer 34 according to embodiments of the present invention typically comprises a structure having a plurality of fields.

For example, the buffer table may have the following structure:

Field 1 PLOBID: TMP-PLOBJ identifier for display of entry,

Field 2 NODE_ID: in CBF coding generated GUID,

Field 3 CDP_PLOBID_TAB: table with TMP-PLOBJ identifies and P/T/R combination,

Field 4 SELECTION: actual selection, with CBF characteristics if specified,

Field 5 AGG: used if characteristics in selection specify more than one value,

Field 6 FLG CHANGE CALC: set after calculation in /SAPAPO/CBP_CHANGES_CALC and cleared in /SAPAPO/CBP_RECALCULATION; used for specifying entries which have to be recalculated, Field 7 C_INPUT_DATA: changed input data for all P/T/R combinations of selection and all buckets, Field 8 INPUT_DATA: input data for all P/T/R combinations of selection and all buckets, Field 9 C_DATE_TAB: index information of buckets from DATE_TAB with changed data (for performance reasons), Field 10 DATE_TAB: index information of buckets, Field 11 KEYFS_RULES: key figure information, Field 12 LEVEL: unused→use for specifying owner-member hierarchy relation, Field 13 MEMBER_NODE_ID: unused→use for assigning owner node identification of entry and with this the owner-member relation, Field 14 RESULTS_FOR_DNF: contains all the CBF specific data for the respective entry.

The structure is chosen to be capable of supporting the required data information. For this reason it should be appreciated that the additional fields in the table RESULTS_FOR_DNF in order to allow the calculation of changes and rounding are not required here: C_RESULT_DATA_TMP, C_RESULT_DATA_ORG, C_PROF_RESULT_DATA_TMP, FLG_PLOB_INACTIVE and FLG_NO_CALC. The reason for this is that the calculation is executed by the data storage system and it is only necessary in the present invention to model the dependencies of the entries, that is their hierarchy by hierarchy modeller 35, and their results so that they can be used for the CBF calculations.

Processes which may also be modelled with the buffer table are the following: performing a drill down calculation on an product independent characteristic, which is independent of a previous drill down. To perform this function the following steps may be carried out: 1) fields one to eleven are filled for the new member entries using the standard generation procedure; 2) fields 12 and 13 are filled with a still to be created FM; 3) field 14 is filled with CBF data according to the owner data.

To perform the function of performing a drill down on CBF data after drill down on a product independent characteristic, the following steps may be carried out: 1) the processes which are executed now for one selection have to be done for all the members of the actual drill down.

To perform the function of changing drill down data for an arbitrary drill down situation, the following steps may be carried out: 1) check that only one entry, representing one selection, is directly affected: if this is not the case, do not accept the change; 2) find the correct entry in the buffer table and apply the CBF logic to it. It is noted that in the case of drill down on CBF characteristics (product dependent characteristics) and drill down of product independent (free) characteristics and changing data for the CBF characteristics value, the correct selection is the higher aggregate, that is the owner of the CBF characteristic member; 3) apply the data storage system logic, for example, the LiveCache logic, to the data represented by the affected entry; 4) after rereading data from the data storage system, all the entries in the buffer table are updated.

Figure 3:
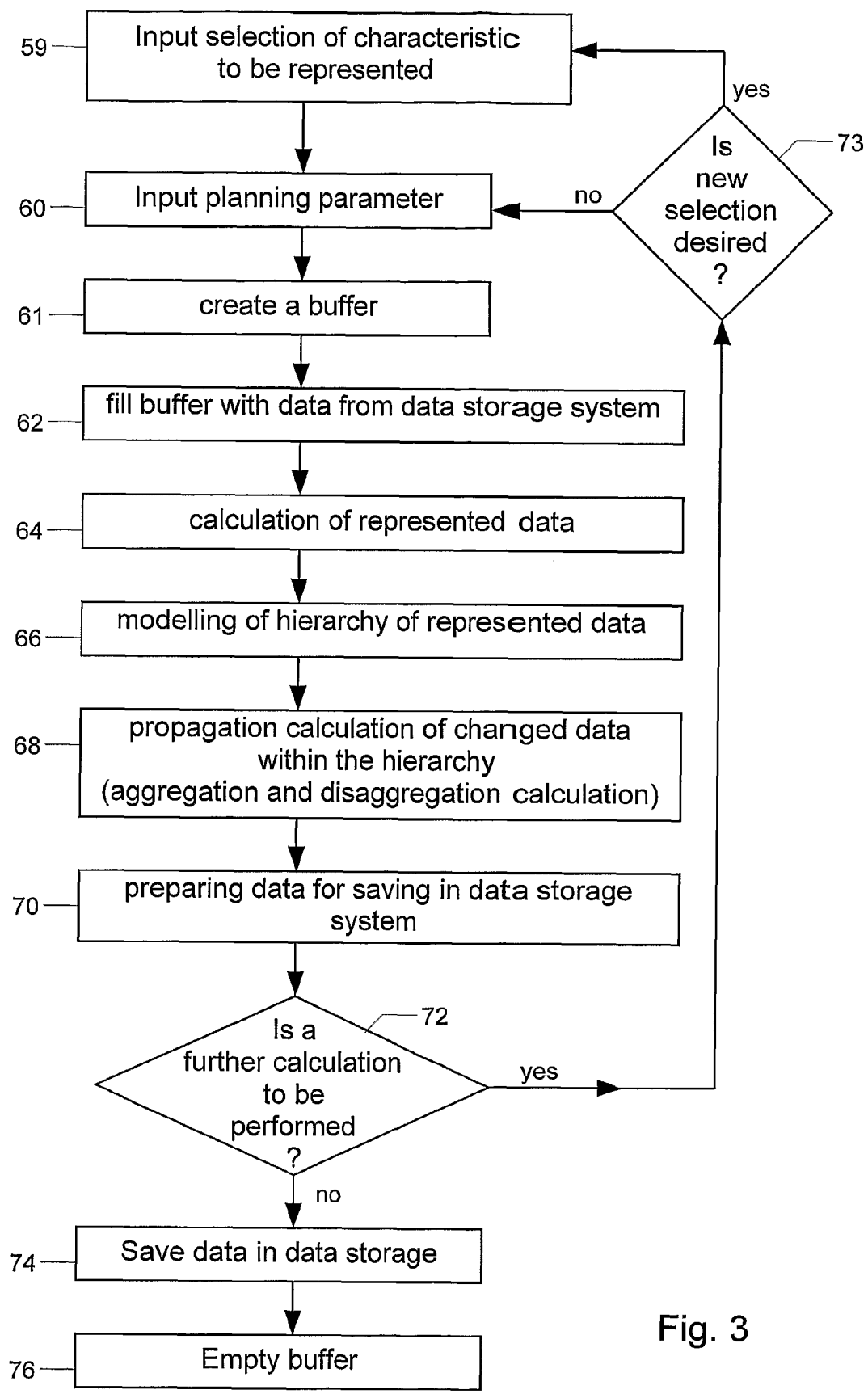
FIG. 3 is a flowchart showing a demand planning process in accordance with an embodiment of the invention.

FIG. 3 is a flowchart showing a demand planning process in accordance with an embodiment of the invention. According to an embodiment of the present invention a method of planning demand for a configurable product having at least one product dependent characteristic and one product independent characteristic in a managed supply chain is provided, comprising the steps of:

providing a data storage system to store data with respect to a plurality of product independent characteristics and product dependent characteristics, inputting (step 60) the selection of at least one product to be represented, inputting (step 60) the selection of a particular characteristic to be represented, inputting (step 60) a planning parameter with respect to the selection of a particular characteristic or product, loading (step 62) data to be represented from the data storage system into a buffer, performing (step 64) a calculation on the represented data with respect to the product dependent characteristics and the product independent characteristics, modelling (step 66) a hierarchy of the represented data, wherein the hierarchy is defined in accordance with the planning parameter, using (step 68) the hierarchy for the administration of the buffered data.

In particular, the steps include inputting the user defined selection (step 59) and inputting the planning parameter (step 60) into the demand planner. Typically, the planning parameter can be changed readily by the user, and is commonly referred to as "navigating" through the selected data. A buffer is created (step 61), the buffer is filled with data from a data storage system (step 62), a calculation is carried out on the represented data (step 64), a hierarchy is modelled of the represented data (step 66). In a preferred embodiment, administration of the buffered data includes the step of: performing a propagating recalculation of a change in the represented data through the data storage system, where the calculation differs from that defined by the planning parameter (step 68).

A further preferred embodiment, includes the step of preparing the recalculated represented data for saving in the data storage system.

If a further calculation is to be performed with different user defined parameters, the process includes the step (step 73) of determining whether a new selection is desired. If yes, the process returns to step 59, if no the process returns to step 60. If not, the data is saved in the data storage system (step 74). For example, this step may include the further step of loading the recalculated represented data into the data storage system.

and the buffer is emptied (step 76).

As described previously, the calculation is a disaggregation calculation and the recalculation is a disaggregation or an aggregation calculation. In a preferred embodiment, the modelling step includes modelling the hierarchy with respect to the product dependent characteristics and the product independent characteristics. By modelling in such a way, a calculation, for example a drill down calculation, can be carried out on both product dependent and product independent characteristics. In a further embodiment, the calculating step is carried out by the data storage system. By using the data storage system to carry out the calculating step a fast and flexible demand planner is provided. In a further preferred embodiment, the calculating and recalculating steps calculate the incidence of each product dependent characteristic and each product independent characteristic in accordance with the selected product. Thus, demand planning can be carried out with respect to a mixture of product dependent and product independent characteristics.

The invention as described can be implemented in digital electronic circuitry, or in computer hardware, firmware, software, or in combination thereof. An apparatus according to the present invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removeable disks; magneto-optical disks; and optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Whilst specific embodiments of the invention have been described above, it will be appreciated that the invention may be practiced otherwise than as described.

In the embodiments described certain products, characteristics, planning parameters and other parameters are referred to. The present invention is not limited to these particular products etc, and these are given by way of example only. The present invention has broad application to the demand planning of any product including configurable products.

The description is not intended to limit the invention. For example, the order steps be performed of the present invention is not limited to that order prescribed in the claims.

The invention claimed is:

1. A computer-implemented method of planning demand for a configurable product having at least one product dependent characteristic and one product independent characteristic in a managed supply chain, comprising:
    providing a data storage system to store data with respect to a plurality of product independent characteristics and product dependent characteristics;
    receiving, by a processor, a selection of at least one product to be represented;
    receiving, by the processor, a selection of a particular characteristic to be represented;
    receiving, by the processor, a planning parameter with respect to the selection of a particular characteristic or product;
    loading, by the processor, data from the data storage system into a buffer;
    performing, by the processor, a calculation on the data with respect to the product dependent characteristics and the product independent characteristics;
    modelling, by the processor, a hierarchy of the represented data, wherein the hierarchy is defined in accordance with the planning parameter; and
    using the hierarchy to administer the buffered data, the administration of the buffered data comprising performing a propagating recalculation of a change in the data through the data storage system, wherein the recalculation differs from that defined by the planning parameter and includes calculating an incidence of each product dependent characteristic and each product independent characteristic in accordance with the selected product.

2. The method according to claim 1, further comprising: storing the recalculated data in the data storage system.

3. The method according to claim 2, further comprising: loading the recalculated data into the data storage system.

4. The method according to claim 1, wherein the calculation is a disaggregation calculation.

5. The method according to claim 1, wherein the recalculation is a disaggregation or an aggregation calculation.

6. The method according to claim 1, wherein the data storage system is an object oriented data base.

7. The method according to claim 1, wherein the modelling step includes modelling the hierarchy with respect to the product dependent characteristics and the product independent characteristics.

8. The method according to claim 1, wherein the calculating step is carried out by the data storage system.

9. A demand planner apparatus for planning demand for a configurable product in a managed supply chain, said demand planner apparatus comprising:
    a storage medium storing processor readable code to plan demand for a configurable product in a managed supply chain, said code comprising:
        data loading code to load data from a data storage system into a buffer,
        calculation performing code to perform a calculation on the data with respect to product dependent characteristics and product independent characteristics, and
        hierarchy modelling code to model a hierarchy of the data, wherein the hierarchy is defined in accordance with a planning parameter, wherein the hierarchy is used to administer the buffered data, and the administration of the buffered data comprises performing a propagating recalculation of a change in the data through the data storage system, the recalculation differing from that defined by the planning parameter and including calculating an incidence of each product dependent characteristic and each product independent characteristic in accordance with the selected product, and
    wherein the demand planner is operatively associated with the data storage system to store data with respect to the product independent characteristics and the product dependent characteristics, and wherein the demand planner is operatively associated with a user interface for receiving input of a selection of at least one product to be represented, input of a selection of a particular characteristic to be represented, and input of the planning parameter with respect to the selection of a particular characteristic or product.

10. The demand planner apparatus according to claim 9, wherein administering the buffered data includes performing a propagating recalculation of a change in the data through the data storage system, where the calculation differs from that defined by the planning parameter.

11. A computer-readable medium storing program instructions executable by a processor to perform a method of planning demand for a configurable product having at least one product dependent characteristic and one product independent characteristic in a managed supply chain, the method comprising:
    providing a data storage system to store data with respect to a plurality of product independent characteristics and product dependent characteristics;
    receiving a selection of at least one product to be represented;
    receiving a selection of a particular characteristic to be represented;
    receiving a planning parameter with respect to the selection of a particular characteristic or product;
    loading data from the data storage system into a buffer;
    performing a calculation on the data with respect to the product dependent characteristics and the product independent characteristics;
    modeling a hierarchy of the represented data, wherein the hierarchy is defined in accordance with the planning parameter; and
    using the hierarchy to administer the buffered data, the administration of the buffered data comprising performing a propagating recalculation of a change in the data through the data storage system, wherein the recalculation differs from that defined by the planning parameter and includes calculating an incidence of each product dependent characteristic and each product independent characteristic in accordance with the selected product.

* * * * *